Feb. 14, 1961  M. TEN BOSCH ET AL  2,971,401
CONSTANT SPEED AND SYNCHRONOUS DRIVE SYSTEMS
Filed Jan. 11, 1956
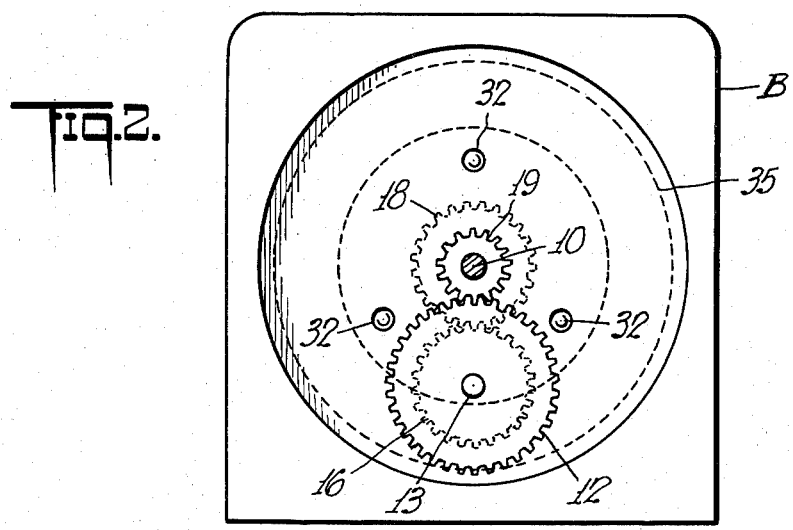
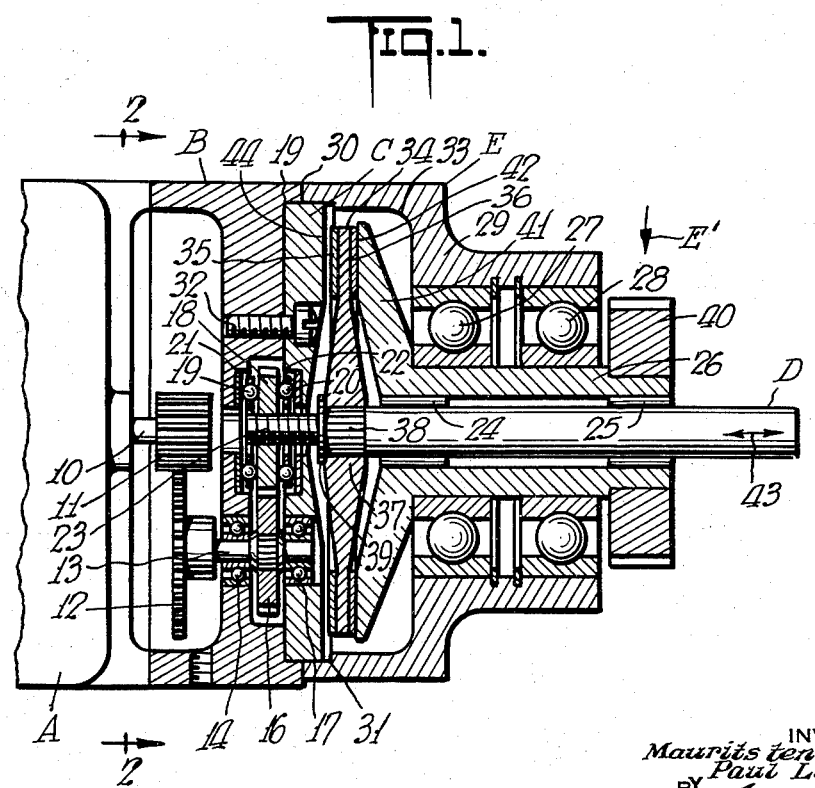
INVENTORS
Maurits ten Bosch
Paul Lang
BY
ATTORNEY

United States Patent Office 2,971,401
Patented Feb. 14, 1961

2,971,401

CONSTANT SPEED AND SYNCHRONOUS DRIVE SYSTEMS

Maurits Ten Bosch, White Plains, and Paul Lang, Katonah, N.Y., assignors to M. Ten Bosch, Inc., Pleasantville, N.Y., a corporation of New York Filed Jan. 11, 1956, Ser. No. 558,521

14 Claims. (Cl. 74—665)

The present invention relates to constant speed and synchronous drive systems, and particularly relates to constant speed and synchronous motor drive systems.

Although not restricted thereto, the present invention is particularly adapted to relatively low power constant speed and synchronous drive systems, which may be used for computers, meters, control mechanisms, and the like.

Constant speed and synchronous drive systems, particularly those utilizing electric motors, usually have a very low power output, and to retain the accurate speed and timing which is necessary in making computers, meters, control mechanisms, and other devices, it is necessary to limit the power derived from constant speed and synchronous power sources.

It is among the objects of the present invention to provide a novel mechanism which will enhance a constant speed and synchronous drive system, and without loss in the accuracy in the speed and timing will give sufficient power to meet all necessary requirements in various types of computers or meters, or control mechansms.

A further object of the present invention is to provide a reliable constant speed and synchronous drive system for computers, meters, control mechanisms, and the like, which will readily overcome functional effects and give sufficient power to achieve desirable control functions without loss of accuracy of the speed or timing.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a relatively high power output from a constant speed and synchronous drive motor in which an intermediate clutch arrangement is employed, which is connected to an outside power source by which it will feed in power to the drive system without loss in the accuracy desired in the control function.

In one preferred form of the invention the use of the constant speed and synchronous motor is connected by a gearing arrangement to a main output shaft. This output shaft at the same time consists of a clutch arrangement which enables connection to an additional power source which may be fed into the main shaft without disturbing the accuracy of the speed or timing.

The present invention has a broad application to direct current constant speed motors as well as synchronous alternating current motors in which a small size constant speed motor varying from 100th to 1000th horsepower may achieve an output of $\frac{1}{60}$ to $\frac{1}{15}$ horsepower without loss of control function.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side longitudinal sectional view of one form of a drive system according to the present invention.

Fig. 2 is a transverse sectional view upon the line 2—2 of Fig. 1.

Referring to Fig. 1 there is shown a constant speed or synchronous motor or power source A, which may have relatively low output less than $\frac{1}{100}$ horsepower.

This power source will drive the shaft 10 and in turn will drive the pinion 11. The pinion 11 meshes with the gear 12, which drives the shaft 13.

The shaft 13 has a ball bearing 14 in the body B. The shaft 13 in turn drives the gear 16, which also has a ball bearing 17 in the insert plate C, which fits in the recess 19 in the body B.

The gear 16 meshes with and drives the gear 18, which has the opposite ball thrust bearings 19 and 20, which are received in the pockets 21 and 22, respectively, in the body B, and the plate C.

The gear 18 is reciprocally mounted on the reduced diameter threaded end 23 of the main shaft D.

The main shaft D has bearings 24 and 25 in the sleeve 26. The sleeve 26 in turn has double ball bearing structures 27 and 28 inside of the nipple 29 of the end body structure E.

The end body structure E abuts the body B at 30 and fits on the ring or plate C by means of the socket or recess 31.

The plate C in turn is bolted in place by the body bolts 32. Positioned on the shaft D and rotating inside of the cup shaped recess 33 is the clutch plate 34 having the opposite annular friction faces 35 and 36.

This clutch plate 34 has an enlarged central portion 37 which fits on the knurled portion 38 of the shaft D, and which is held in position by means of the disc 39.

The rotating sleeve 26 is driven by an outside power source through the gear 40, and it has a flat conical clutch plate 41 at its inside and which rotates in the recess 33.

The clutch plate 41 has the face 42 which may contact the friction face 36 and drive the clutch member 34. This is controlled by means of the threaded connection 23 to the gear 18. This threaded connection permits a movement as indicated by the double arrow 43 of the shaft D.

When the shaft D is moved to the right by the threaded connection 23, the clutch plate face 42 and friction face 36 will contact and the shaft D will be driven both from the motor A as well as through the power source E, which is being applied to the gear 40.

On the other hand, when by means of the threaded connection 23 the shaft D is moved to the left, the contact face 42 and the friction face 36 will be separated, disconnecting the drive E through the gear 40.

The amount of movement to the left may be sufficient to cause the friction face 35 to contact the face 44 of the plate C, giving a braking effect.

By the relatively compact lightweight attachment, shown in Figs. 1 and 2, the power at the shaft D may be multiplied by a factor of anywhere from 10 to 100 or even to 1000 without loss of timing or control function of the constant speed or synchronous motor A.

The shaft D will normally be connected to the computer, meter, or other control mechanism. If the shaft D tends to slow due to excess power consumption it would have the effect of possibly overcoming the constant speed or synchronous motor A.

The screw connection 23 will immediately throw the power source E into operation through the clutch plate 34 and the clutch disc 41. This will immediately supply sufficient power to enable the shaft to continually rotate at the constant speed or in synchronism.

The auxiliary power motor drives the clutch face 42 at a speed somewhat higher than the constant output speed of the shaft D such that there is always slippage between the clutch face 42 and the friction ring 36.

By means of the threaded nut and threaded shaft, part of the torque supplied by the motor A is transformed into an axial force. The pressure between the friction ring 36 and the clutch face 42 as a result of this axial force causes a transfer of torque from 42 to 36 as is normal with any clutch arrangement.

If the load torque increases on the shaft D, the speed will momentarily decrease a very small amount and thereby permit the motor A to produce more torque output which consequently through the threaded screw and threaded nut will increase the pressure between 36 and 42 and thus permit a greater transfer of torque from 42 to 36.

Conversely, if the load torque decreases the output shaft D, the speed will momentarily increase a very small amount and permit the motor A to reduce its torque output and thereby decrease the pressure between 36 and 42 for a smaller transfer of torque from 42 to 36.

The power of the auxiliary motor or source which is fed in as indicated by the arrow E′ in Fig. 1 is the same as or higher than the rate of output of the device.

The power required at the output of the shaft D, that is, at the right of shaft D, controls the power transfer from the auxiliary source E′ to the shaft D through the arrangement shown.

Both the constant speed of synchronous motor A and the auxiliary power source E′ are connected by gearing to the output shaft D but the auxiliary power source E is connected clutchwise while the main source A is connected through a gearing train. The present device is not an "on" and "off" device and it is constantly applying power even though said power is variable. The "on" and "off" feature of clutching devices has been altogether eliminated.

Where a synchronous drive motor is employed it is usually a 60 cycle motor although a fractional frequency or multiple frequency synchronous motor may also be applied as source A.

However, the present invention has a preferred application to constant speed motors.

In general, the present invention permits very low horse power, constant speed or synchronous motors having horse powers ranging from 1/600 to 1/6000 to have a power output ranging from 1/60 to 1/100 without loss of the constant speed or frequency control.

It is thus apparent that the applicant has provided a novel, lightweight, inexpensive attachment in constant speed or synchronous power systems which will enable the maintenance of the constant speed control over a large range of power consumption, which may be well beyond the power supply of the constant speed or synchronous power motor source.

Having now particularly described and ascertained the nature of the invention, and in what manner the same is to be performed, what is claimed is:

1. A constant speed power supply having as its constant speed control a motor, an output shaft having its speed controlled and maintained at a constant speed in a predetermined relationship to that of the motor, said speed being maintained throughout while additional power is automatically supplied to said shaft when required, an auxiliary power source to supply additional power to said shaft without changing said speed, a first intermittent drive connection from said power source to said shaft, a second continuous drive connection from said motor to said shaft and means to actuate said first drive connection when increased power is required from said output shaft.

2. The supply of claim 1, said shaft being mounted to reciprocate depending upon the power requirements, reciprocating in one direction causing supply of additional power from said source and reciprocating in the other direction releasing the power supply from said source.

3. The supply of claim 1, said shaft having a screw and nut connection at its driven end and carrying a reciprocating clutch engaged and disengaged by relative rotation of said screw and nut to supply power from said source in one direction and to disconnect said power supply in a reverse direction.

4. A constant speed and synchronous drive system of the type having a constant speed low power output motor connected to an output shaft, and an auxiliary power source, characterized in the provision of an intermediate clutch having a clutch driven member connected to said output shaft and a clutch driving member connected to said auxiliary power source, a gearing train connecting said motor to said shaft and means to clutch said clutch driven and clutch driving members together to maintain a constant output from said shaft.

5. The system of claim 4, said last mentioned means including means to reciprocate said shaft to cause driving contact.

6. The system of claim 4, said last mentioned means including an axial screw connection between the gearing tram and the output shaft to reciprocate said driven member into and out of contact with the driving member.

7. A constant speed and synchronous drive system having a main constant speed power supply including a motor, an output constant speed shaft, an auxiliary power input and automatic means to increase and decrease the power required from said auxiliary input depending upon the power required from said shaft, first connecting means drivingly connecting said main power supply to said output shaft, second connecting means to drivingly connect said auxiliary power input to said first connecting means also to supply power to said output shaft from said auxiliary input, said automatic means serving to drivingly connect and disconnect said second connecting means from said first connecting means.

8. A constant speed and synchronous drive system having a main constant speed power supply including a motor, an output constant speed shaft, a drive connection therebetween, an auxiliary power input and automatic means to increase and decrease the power transmitted from said auxiliary input depending upon the power required by said shaft, said last mentioned means including a reciprocal clutch element mounted upon said shaft to cause connection and disconnection between said power input and said output shaft and means to reciprocate said shaft to cause variation of the degree of clutching depending upon the power required from said shaft.

9. A constant speed and synchronous drive system having a main constant speed power supply including a motor, an output constant speed shaft, an auxiliary power input and automatic means to increase and decrease the power transmitted from said auxiliary input depending upon the power required by said shaft, said last mentioned means including gearing train connection between said motor and said shaft and means to displace the shaft to cause connection and disconnection between said power input and said output shaft controlled by said power required from said shaft.

10. A constant speed drive system comprising a constant speed motor, a constant speed output shaft, a drive connection therebetween, an auxiliary power source drive connected to said shaft, and means to vary the power taken from said auxiliary source and supplied to said output shaft when increased power is required from said output shaft.

11. A constant speed drive system comprising a constant speed motor, a constant speed output shaft, a drive connection therebetween, an auxiliary power source, and means to vary the power taken from said auxiliary source and supplied to said output shaft when increased power is required from said output shaft, said last mentioned means consisting of a threaded member in said drive connection and a clutch which is actuated by said threaded connection.

12. A synchronous or constant speed control comprising a low power constant speed motor, an output shaft, a gear train connection between the motor and the shaft, an auxiliary power source and a clutch to connect said auxiliary power source to said shaft, said clutch serving to connect and disconnect the power input to the output shaft in accordance with the power requirement at the output shaft.

13. A synchronous or constant speed control comprising a low power constant speed motor, an output shaft, a gear train connection between the motor and the shaft, an auxiliary power source and a clutch to connect said auxiliary power source to said shaft, said shaft being provided with means to connect the clutch when extra power is required from said shaft and to disconnect the clutch when extra power is no longer required from said shaft.

14. A synchronous or constant speed control comprising a low power motor, an output shaft, a gear train connection between the motor and the shaft, an auxiliary power source and a clutch to connect said auxiliary power source to said shaft, said shaft being provided with a threaded extension and gear train being provided with a gear having a threaded mount on said threaded extension, said threaded mount serving to reciprocate said shaft and to clutch and unclutch said clutch depending upon the power requirements of said shaft.

References Cited in the file of this patent

UNITED STATES PATENTS

| | | |
|---|---|---|
| 628,190 | Stone | July 4, 1899 |
| 1,157,307 | Henderson | Oct. 19, 1915 |
| 1,263,125 | Sawyer | Apr. 16, 1918 |
| 1,836,298 | Winther | Dec. 15, 1931 |
| 2,029,094 | De Vlieg | Jan. 28, 1936 |
| 2,366,646 | Orr | Jan. 2, 1945 |
| 2,399,685 | McCoy | May 7, 1946 |
| 2,602,656 | Clark | July 8, 1952 |